United States Patent [19]
Kim et al.

[11] Patent Number: 5,524,118
[45] Date of Patent: Jun. 4, 1996

[54] WAVELENGTH-VARYING MULTI-WAVELENGTH OPTICAL FILTER LASER USING A SINGLE PUMP LIGHT SOURCE

[75] Inventors: Kyong-Hon Kim; Hak-Kyu Lee; Seo-Yeon Park; El-Hang Lee, all of Daejeon, Rep. of Korea

[73] Assignee: Electronics and Telecommunications Research Institute, Daejeon, Rep. of Korea

[21] Appl. No.: 358,532

[22] Filed: Dec. 19, 1994

[30] Foreign Application Priority Data

Dec. 7, 1994 [KR] Rep. of Korea ............... 94-33093

[51] Int. Cl.$^6$ ............................................. H01S 3/30
[52] U.S. Cl. ..................... 372/6; 372/22; 372/23; 372/97
[58] Field of Search .............................. 372/69, 6, 19, 372/22, 23, 97, 106, 703; 359/326, 328

[56] References Cited

U.S. PATENT DOCUMENTS

| | | | |
|---|---|---|---|
| 5,132,976 | 7/1992 | Chung et al. | 372/6 |
| 5,233,619 | 8/1993 | Furuhashi et al. | 372/6 |
| 5,311,603 | 5/1994 | Fidric | 372/6 |
| 5,337,375 | 8/1994 | Nyman et al. | 372/6 |

OTHER PUBLICATIONS

Dawson, Jay W. et al.: "Co-lasing in an electrically tunable erbium-doped fiber laser"; pp. 3090-3092, Jun. 22, 1992; Applied Phys. Lett. 60(25). American Inst. of Physics.

Park, Namkyoo et al: "Multiple wavelength operation of an erbium-doped filter laser"; 2 pgs. article; Mar. 16, 1992; IEEE log No. 9200540.

Poustie, Jr. Alistair J. et al.: "Multiwavelength fiber laser using a spatial mode beating filter"; pp. 716-718, May 15, 1994; Optics Letters, vol. 19, No. 10.

Primary Examiner—Rodney B. Bovernick
Assistant Examiner—Robert E. Wise
Attorney, Agent, or Firm—Larson and Taylor

[57] ABSTRACT

A wavelength-varying multi-wavelength optical filter laser using a single pump light source is disclosed. The laser comprises a wavelength-division multiplexing coupler for applying an output from a single pump light source, a first multi-branch optical fiber coupler for branching the light from the single pump light source into a plurality of optical paths, an erbium-doped fiber located at each of optical paths, wavelength-varying optical filters located at rear of each erbium-doped fiber in each optical paths, said wavelength-varying optical filters for generating laser outputs of different wavelengths in each optical paths, optical isolators located between the erbium-doped fiber and the wavelength-varying optical filter in each optical paths, said optical isolators for reducing interference between laser outputs to be stable, optic attenuators located at rear of the wavelength-varying optical filter in each optical paths, said attenuators for regulating a mode beating between laser outputs of different wavelengths, thereby causing the multi-wavelength laser oscillation to be possible, a second multi-branch optical fiber coupler for coupling branched-optical paths, and a variable optical fiber coupler located at rear of the second multi-branch optical fiber, said variable optical fiber coupler for regulates a coupling ratio of the second variable optical fiber coupler, thereby making the output thereof to be maximum.

3 Claims, 3 Drawing Sheets

WAVELENGTH-VARYING MULTI-WAVELENGTH OPTICAL FILTER LASER USING A SINGLE PUMP LIGHT SOURCE

BACKGROUND OF THE INVENTION

The present invention relates to a wavelength-varying multi-wavelength light source applicable to non-linear effect induction such as a wavelength-division multiplexing optical communication or 4 optical wave mixing, and more particularly to a wavelength-varying multi-wavelength optical filter laser using a single pump light source capable of converting wavelength, which is further serviceable and uses few assemble parts as compared with the prior art.

In general, necessity of a wavelength-division or a frequency-division multiplexing for a wide band optical communication has been tending upwards more and more, now. A wavelength-varying multi-wavelength light source may play a very important role in embodying said multiplexing.

In a wavelength-division or a frequency-division multiplexing, an optical fiber laser or a semiconductor laser may be used as a light source which is capable of a wavelength conversion or oscillates at different wavelengths.

In order to obtain the desired wavelength, the prior semiconductor laser which is used as a light source oscillating at different wavelengths as above described, may be used by fabricating in one chip through a complicate process or by constituting a wavelength-varying semiconductor laser.

However, the wavelength-varying semiconductor laser causes the problems that the entire configuration is complicate as well as it is difficult to obtain a multi-wavelength output.

The above problems are to be explained in detail hereinafter with reference to accompanying drawings.

FIG. 1 shows a diagram illustrating the prior wavelength-varying multi-wavelength optical filter laser using a wavelength-varying optical filter. As shown in FIG. 1, the prior wavelength-varying multi-wavelength optical filter laser using a polarizer POL and a polarization controller PC laser has been proposed. However, the prior laser is difficult to extend multi-wavelengths because it has instability that the polarization is changeable due to a trifling distortion of an optical fiber and it has lower practical use due to a large bulk of the polarization controller.

FIG. 2 shows the prior wavelength-varying multi-wavelength optical fiber laser using a wavelength-division multiplexer.

When the wavelength-division multiplexers is originally fabricated, mainly it is divided into the fixed wavelength, so that the optical fiber laser has no a wavelength-varying characteristic.

The prior laser that makes a ring-type optical fiber laser cavity using a single mode optical fiber containing rare earth elements for gain and a multi-mode optical fiber and obtains a multi-wavelength laser output using a filter characteristic depending on a wavelength due to spatial mode beating between two basic mode $LP_{01}$ and $LP_{11}$ in the multi-mode optical fiber, has been proposed.

However, the prior laser has problems that the wavelength space of a multi-wavelength laser should be control in accordance to a length of a multi-mode optical fiber and it has no a separate wavelength-varying characteristic of each laser wavelengths.

SUMMARY OF THE INVENTION

Accordingly, it is an object of the present invention to solve problems of the prior laser using a wavelength-varying multi-wavelength light source and provide a wavelength-varying multi-wavelength optical filter laser configuration using a single pump light source, which has a higher serviceable value.

These objects and Other features are achieved by providing a wavelength-varying multi-wavelength optical filter laser using a single pump light source, comprising a wavelength-division multiplexing coupler for applying an output from a single pump light source, a first multi-branch optical fiber coupler for branching the light from the single pump light source into a plurality of optical paths, an erbium-doped fiber (hereinafter, referred to as "EDF") located at each of optical paths, wavelength-varying optical filters located at rear of each EDF in each optical paths, said wavelength-varying optical filters for generating laser outputs of different wavelengths in each optical paths, optical isolators located between the EDF and the wavelength-varying optical filter in each optical paths, said optical isolators for reducing interference between laser outputs to be stable, optic attenuators located at rear of the wavelength-varying optical filter in each optical paths, said attenuators for regulating a mode beating between laser outputs of different wavelengths, thereby causing the multi-wavelength laser oscillation to be possible, a second multi-branch optical fiber coupler for coupling branched-optical paths, and a variable optical fiber coupler located at rear of the second multi-branch optical fiber, said variable optical fiber coupler for regulates a coupling ratio of the second variable optical fiber coupler, thereby making the output thereof to be maximum.

DETAILED DESCRIPTION OF THE INVENTION

Figure 1A:
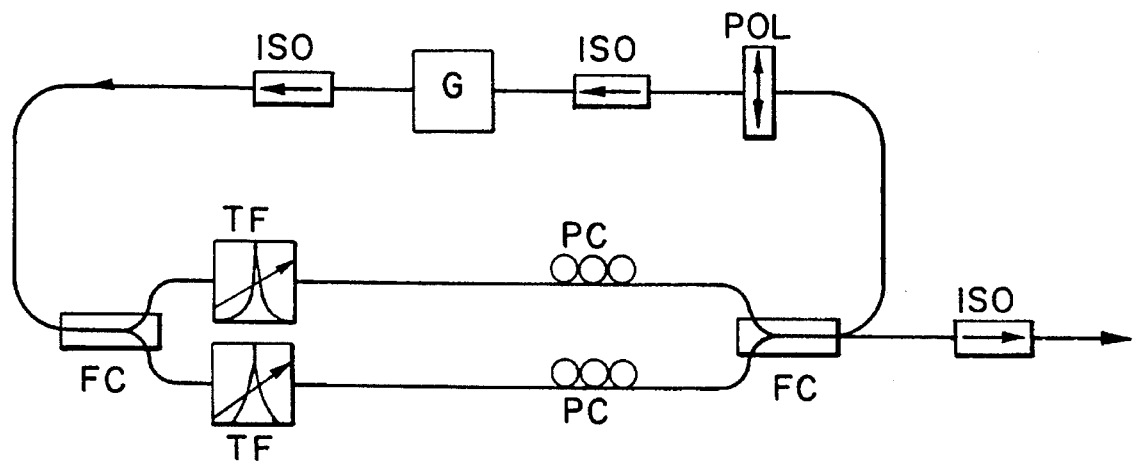
FIG. 1 is a configuration diagram of the prior wavelength-varying multi-wavelength optical filter laser using a wavelength-varying optical filter.
Figure 1B:
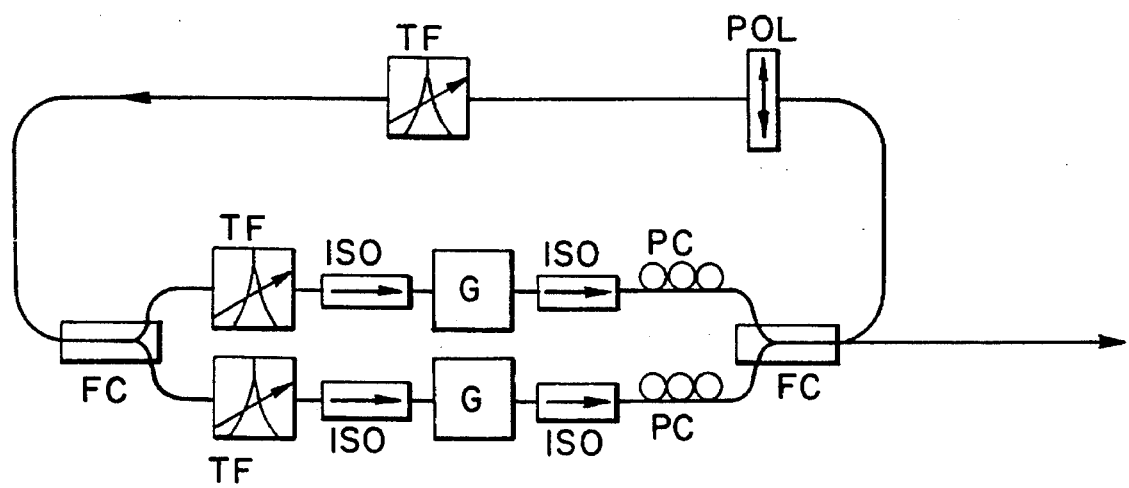
Figure 2A:
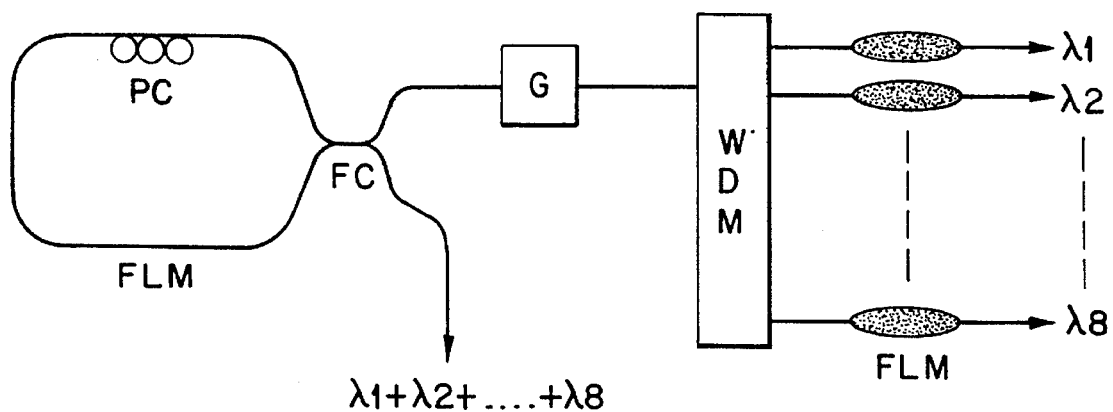
FIG. 2 is a configuration diagram of the prior wavelength-varying multi-wavelength optical filter laser using a wavelength-division multiplexer.
Figure 2B:
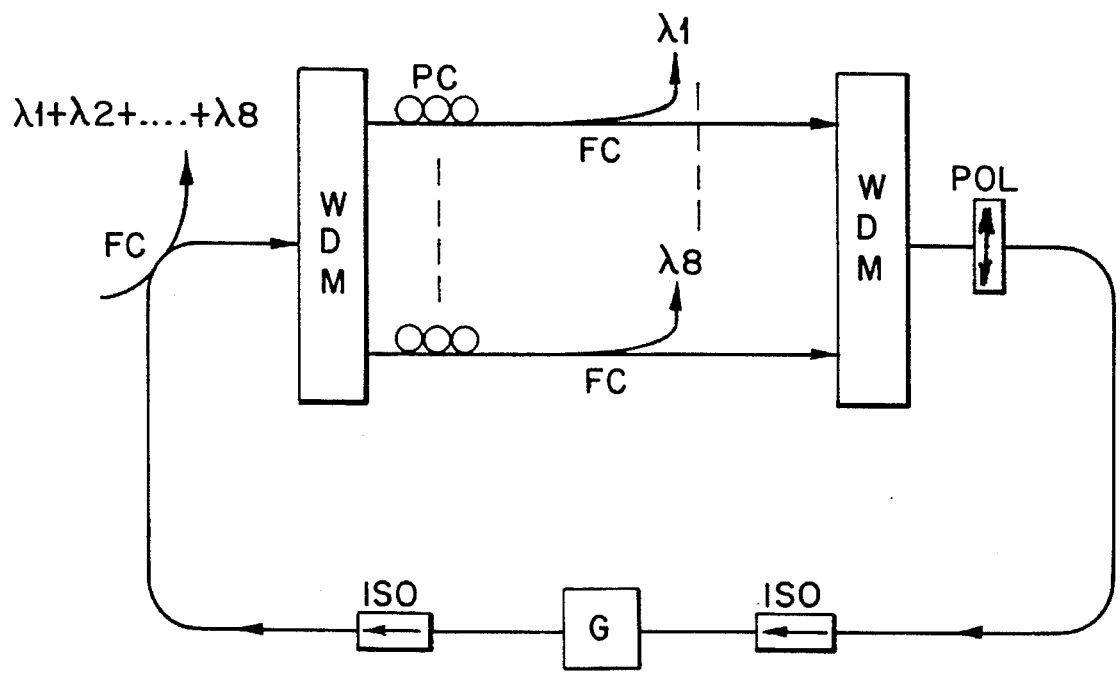
Figure 3:
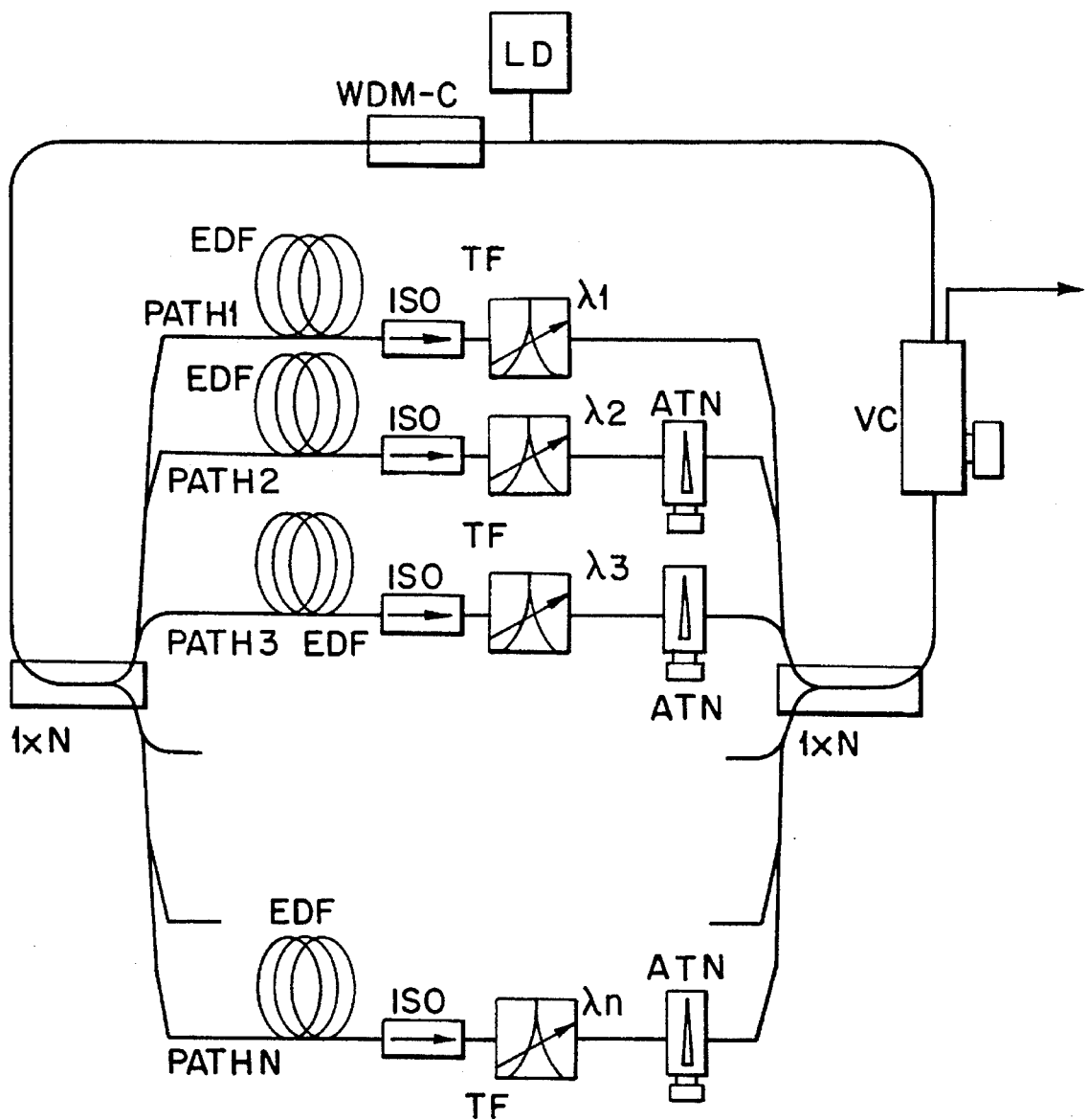
FIG. 3 is a configuration diagram of a wavelength-varying multi-wavelength optical filter laser using a single pump light source in accordance with the present invention.

FIG. 3 shows a configuration of a wavelength-varying multi-wavelength optical filter laser using a single pump light source in accordance with the present invention.

Referring to FIG. 3, the wavelength-varying multi-wavelength optical filter laser using a single pump light source comprises a single pump light source LD for generating light, a wavelength-division multiplexing coupler WDM-C for applying an output from the single pump light source, a first multi-branch optical fiber coupler 1xN for branching the light from the single pump light source into a plurality of optical paths, EDF which is located at each of optical paths, wavelength-varying optical filters TFs located at rear of each of EDF in each optical paths and generates laser outputs of different wavelengths in each optical paths, optical isolators ISOs which is located between the EDF and the wavelength-varying optical filter TF in each optical paths and reduces interference between laser modes, optic attenuators Atns which is located at rear of the wavelength-varying optical filter TF in each optical paths and regulates a mode beating between laser modes of different wavelengths, thereby causing the multi-wavelength laser oscillation to be possible, a second multi-branch optical fiber coupler 1xN for coupling branched-optical paths, and a variable optical fiber coupler VC which is located at rear of the second multi-branch optical fiber and regulates a coupling ratio of the laser resonator.

The output from the single pump light source LD is applied to the wavelength-division multiplexing coupler WDM-C to pump the EDFs which are located at each of optical paths branched by the multi-branch optical fiber coupler 1xN. The wavelength-varying optical filters TFs are inserted at each of optical paths, thereby constituting the wavelength-varying multi-wavelength optical fiber laser.

The optical isolators ISOs are used in each of optical paths to reduce interference between laser modes of different wavelengths which are oscillated at different paths, so that to it makes an output of the laser to be stable and the optic attenuators Atns are used to regulate a mode beating between laser modes of different wavelengths, so that the multi-wavelength laser oscillation is possible.

And, the variable optical fiber coupler VC regulates a coupling ratio of a laser resonator so as to make the output of the optical fiber laser to be maximum and serves as an output terminal.

In one of a plurality of optic paths, a length of EDF is somewhat smaller or larger than the optimal length as compared with other optic paths to slightly reduce a gain characteristic, so that the optic attenuator Atn is not constituted in the path Path1.

The multi-branch optical fiber coupler 1xN has a wide band characteristic, so that the device having a comparatively uniform branch characteristic in a pump wavelength and a laser wavelength and unrelated to a deflection becomes used as the multi-branch optical fiber coupler.

Devices such as the optical isolator ISO, the wavelength-varying optic filter FT, the optic attenuator Atn, the variable optic filter coupler VC and the wavelength-division multiplexing coupler WMD-C has a characteristic unrelated to deflection.

According to the present invention, a wavelength-varying multi-wavelength laser output can be obtained using a single optical fiber laser. And a laser which is capable of improving a laser output characteristic and reducing assemble parts and has a higher utility as compared with the prior art can be provided.

Laser outputs of different wavelengths can be independently varied and the wavelength-varying multi-wavelength optic fiber laser is applicable to a light source for generating an optic signal of a new wavelength by a wavelength-division multiplexing optical communication or 4 optical wave mixing, in the future and contributes to a development of this field.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A wavelength-varying multi-wavelength optical filter laser, comprising:

a single pump light source for generating light;

a wavelength-division multiplexing coupler for applying an output from the single pump light source;

a first multi-branch optical fiber coupler for branching the light from the single pump light source into a plurality of optical paths;

an erbium-doped fiber located at each of optical paths;

wavelength-varying optical filters located at rear of each erbium-doped fiber in each optical paths, said wavelength-varying optical filters for generating laser outputs of different wavelengths in each optical paths;

optical isolators located between the erbium-doped fiber and the wavelength-varying optical filter in each optical paths, said optical isolators for reducing interference between laser outputs to be stable;

optic attenuators located at rear of the wavelength-varying optical filter in each optical paths, said attenuators for regulating a mode beating between laser outputs of different wavelengths, thereby causing the multi-wavelength laser oscillation to be possible;

a second multi-branch optical fiber coupler for coupling branched-optical paths; and a variable optical fiber coupler located at rear of the second multi-branch optical fiber, said variable optical fiber coupler for regulating a coupling ratio of the second variable optical fiber coupler, thereby making the output thereof to be maximum.

2. The laser as claimed in claim 1, wherein in one of a plurality of optic paths, a length of the erbium-doped fiber is somewhat smaller or larger than the optimal length as compared with other optic paths, and optic attenuator Atn is not constituted in the path.

3. The laser as claimed in claim 1, wherein thee multi-branch optical fiber couplers have a wide band characteristic.

* * * * *